United States Patent
Mellot

(10) Patent No.: US 8,879,048 B2
(45) Date of Patent: Nov. 4, 2014

(54) DEVICE AND METHOD FOR DETERMINING THE DISTANCE TO AN OBJECT

(75) Inventor: Pascal Mellot, Lans en Vercors (FR)

(73) Assignee: STMicroelectronics (Grenoble 2) SAS, Grenoble (FR)

(*) Notice: Subject to any disclaimer, the term of this patent is extended or adjusted under 35 U.S.C. 154(b) by 0 days.

(21) Appl. No.: 13/607,041

(22) Filed: Sep. 7, 2012

(65) Prior Publication Data

US 2013/0077082 A1 Mar. 28, 2013

(30) Foreign Application Priority Data

Sep. 22, 2011 (FR) ...................................... 11 58423

(51) Int. Cl.
*G01C 3/08* (2006.01)
*G01S 17/36* (2006.01)
*G01S 7/491* (2006.01)

(52) U.S. Cl.
CPC ............... *G01S 17/36* (2013.01); *G01S 7/4915* (2013.01); *G01S 7/4912* (2013.01)
USPC ....... 356/4.01; 356/3.01; 356/5.01; 356/4.07; 356/5.09; 356/9; 356/625

(58) Field of Classification Search
USPC .................. 356/4.01, 3.01, 5.01, 9, 4.07, 625
See application file for complete search history.

(56) References Cited

U.S. PATENT DOCUMENTS

| | | | | |
|---|---|---|---|---|
| 3,739,870 A * | 6/1973 | Pelton et al. | ..................... | 367/77 |
| 5,025,322 A * | 6/1991 | Ng | ................ | 358/3.07 |
| 5,748,140 A * | 5/1998 | Schober | ......................... | 342/90 |
| 6,539,368 B1 * | 3/2003 | Chernikov et al. | ............ | 706/41 |
| 6,556,191 B1 * | 4/2003 | Ouchi | ......................... | 345/204 |
| 6,811,087 B2 * | 11/2004 | Nakamura et al. | ....... | 235/462.26 |
| 7,205,845 B2 * | 4/2007 | Harms et al. | ................. | 330/308 |
| 7,423,302 B2 * | 9/2008 | Dosluoglu et al. | ........... | 257/233 |
| 7,795,971 B2 * | 9/2010 | Ikeda | ............................ | 330/253 |
| 7,796,151 B2 * | 9/2010 | Pepe | ............................ | 347/236 |
| 8,217,327 B2 * | 7/2012 | Kim | ............................ | 250/208.1 |
| 2003/0205561 A1 * | 11/2003 | Iso | ............................ | 219/121.71 |
| 2009/0079959 A1 * | 3/2009 | Masuda | ........................ | 356/5.1 |
| 2009/0226184 A1 * | 9/2009 | Nishihara et al. | ............. | 398/188 |

FOREIGN PATENT DOCUMENTS

EP 1944622 7/2008

OTHER PUBLICATIONS

République Franåaise Institut National De La Propriété Industrielle, Rapport De Recherche Préliminaire (Preliminary Search Report); issued in French Patent Application No. 1158423 on May 29, 2012 (2 pages).

* cited by examiner

*Primary Examiner* — Isam Alsomiri
*Assistant Examiner* — Samantha K Abraham
(74) *Attorney, Agent, or Firm* — Slater & Matsil, L.L.P.

(57) ABSTRACT

A method and apparatus for defining, from a first periodic signal, a second signal of same period, including the steps of: generating a third signal exhibiting detectable events; and synchronizing the second signal for each event.

27 Claims, 6 Drawing Sheets

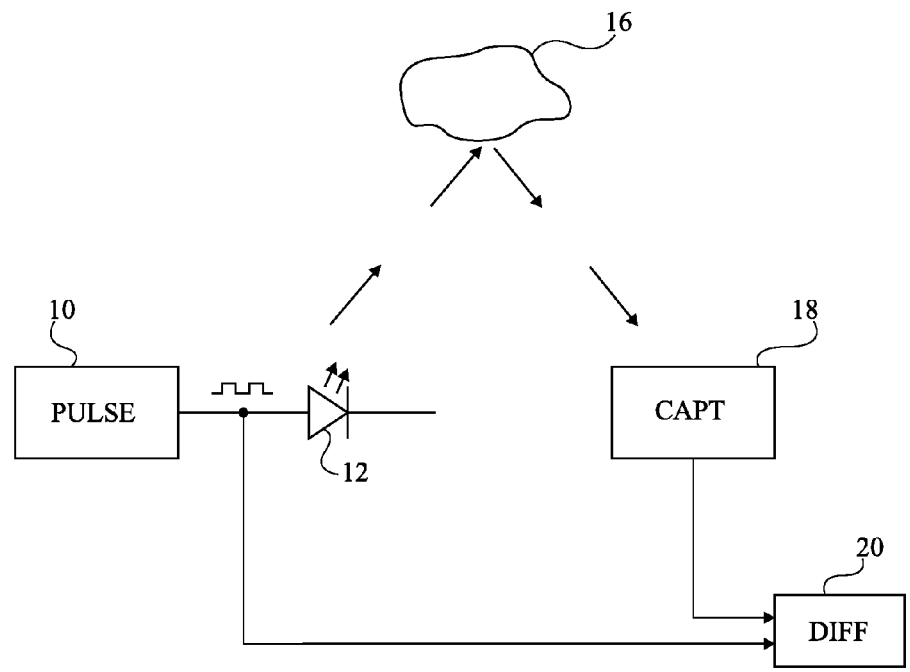
Fig 1
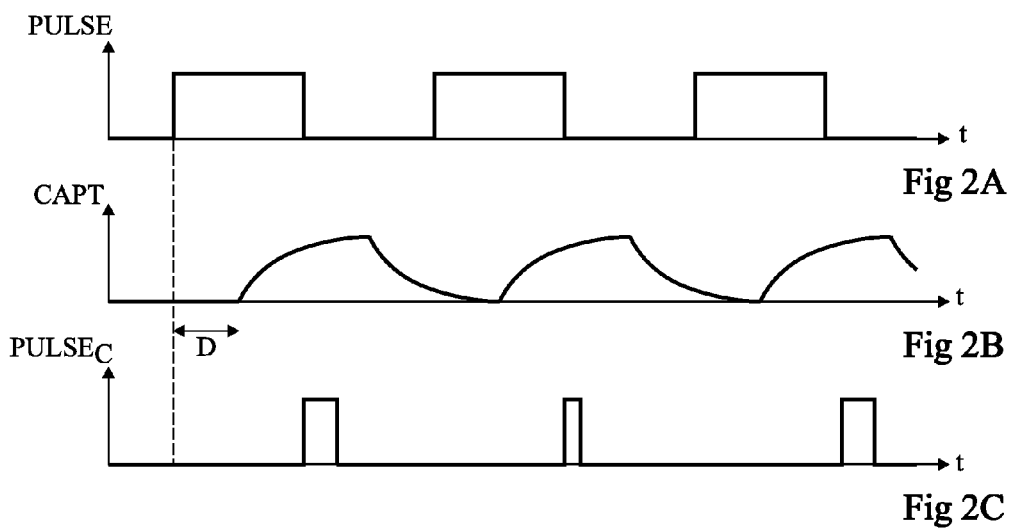
Fig 2A
Fig 2B
Fig 2C

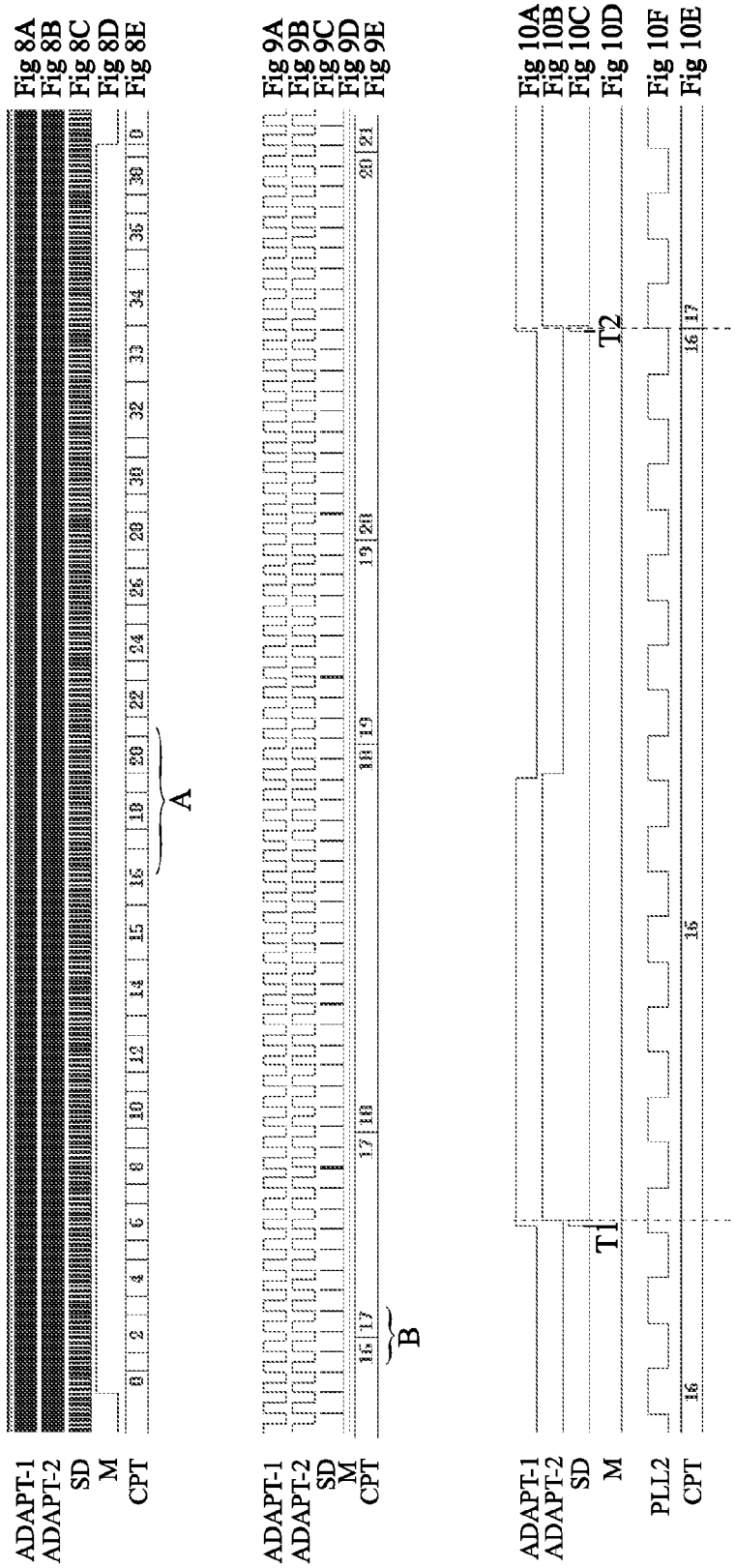

DEVICE AND METHOD FOR DETERMINING THE DISTANCE TO AN OBJECT

This application claims the benefit of French Patent Application No. 1158423, filed Sep. 22, 2011 which application is hereby incorporated herein by reference.

FIELD OF THE INVENTION

The present invention relates to a device for determining the distance to an object. More specifically, the present invention relates to a device enabling accurate determination a distance to an object by taking advantage of the phase shift of a light signal reflected on the object.

BACKGROUND

Many devices for determining the distance to objects are known. One of the most currently used methods is called "Time Of Flight". This method comprises sending a light signal towards the object and measuring the time taken by the signal to travel to the object and back. Generally, the calculation of the time taken by the signal for this travel is obtained by measuring the phase shift between the signal coming out of the light source and the signal reflected on the object and detected by a light sensor. Knowing this phase shift and the speed of light enables determination of the distance to the object.

FIG. 1 illustrates the general principle of the "Time Of Flight" method. In FIG. 1, a generator 10 (PULSE) provides a periodic electric signal, for example, square-shaped. This signal powers a light source 12. As an example, light source 12 may be a light-emitting diode, or any known lighting device, for example, a laser. The signal coming out of light source 12 is transmitted towards an object 16 and is reflected on this object to be detected by a light sensor 18, CAPT. The signal on sensor 18, CAPT, is thus phase-shifted from the signal provided by the generator by a time period proportional to twice the distance to object 16. Calculation means 20 ("DIFF") receive the signals generated by generator 10 and by sensor 18 and calculate the phase shift between these signals to obtain the distance to object 16.

FIGS. 2A to 2C are timing diagrams illustrating the operation of a circuit such as that in FIG. 1. FIG. 2A illustrates a periodic signal "PULSE" capable of being provided by generator 10 of FIG. 1. FIG. 2B illustrates the signal received by sensor 18, CAPT. Due to interactions with the outside and to the components forming sensor 18, the signal received by this sensor has, in this example, variations in the form of capacitor charges and discharges. The signal on sensor 18 is phase-shifted from the signal coming out of generator 10 by a delay D.

Usually, sensor 18 integrates one or several photodetection elements enabling one to efficiently detect the signal received after reflection on object 16. Such elements conventionally are rapid charge transfer photodiodes. Single-photon avalanche diodes, or "SPADs", also called Geiger diodes, may also be used. FIG. 2C illustrates the signal (PULSEC) generated by sensor 18, in the case where this sensor contains such a SPAD.

SPADs operate as follows. At an initial time, the diode is biased to a voltage smaller than its breakdown voltage. The reception of a photon in the diode junction area starts an avalanche in the diode, which creates an electric pulse. The diode is then biased back to a voltage smaller than the breakdown voltage, so that it reacts again to the reception of a photon. SPADs can currently be used in cycles having reactivation periods shorter than 10 ns. Thereby, they can be used at high frequency to detect objects at relatively short distances from the measurement device, for example, distances ranging from a few centimeters to a few tens of centimeters.

As illustrated in FIG. 2C, a disadvantage of SPADs is that, if they receive a light signal such as described in relation with FIG. 2B, the diode avalanche time may slightly vary with respect to this signal. Indeed, the histogram of the number of pulses versus time reflects the power-time profile of the light received by the SPAD. Thus, in the case illustrated in FIGS. 2A to 2C, on a large number of acquisitions, the histogram of the pulse transmission by the SPAD substantially follows the curve of FIG. 2B. The determination of the distance to an object based on the information relative to the delay between the signal transmitted by source 12 and the generation of a pulse by the SPAD is thus not reliable if it is carried out over a single period.

Digital counter devices intended for a histogram comparison, associated with SPAD sensors, are known. However, such devices are relatively complex to implement.

The use of sensors comprising photodiodes of charge transfer on several nodes according to the phase of the signal transmitted by the reference generator is also known. The comparison of the amount of photogenerated charges in phase with the reference signal and phase-shifted therewith provides information as to the distance to the object. However, such devices induce an error in the distance estimate, which may be critical for short distances.

Further, a general disadvantage of known devices is that they are generally sensitive to the ratio between the light used for the detection and the ambient light. Indeed, such devices lose much accuracy when the ambient light is strong with respect to the useful light. Known devices are further sensitive to the waveform of the light emitted by the generator, which is hardly ideal.

There further is a need for a method for determining the distance to the object, which is efficient for short distances and overcomes the disadvantages of known devices.

SUMMARY OF THE INVENTION

One embodiment provides for a method for defining, based on a first periodic signal, a second signal of same period, comprising the steps of: generating a third signal exhibiting detectable events; and synchronizing the second signal for each event.

Another embodiment provides for a device for determining the distance to an object, comprising two circuits, the two circuits receiving a same first signal on their first inputs and respectively receiving, on their second inputs, the signal originating from a first single-photon avalanche diode placed close to a light source powered by the first signal and the signal originating from a second single-photon avalanche diode placed to receive the signal originating from the light source after reflection on an object, the output of the first circuit, respectively of the second circuit, being connected to a non-inverting, respectively inverting, input of an AND gate having its output connected to the input of a device for measuring the duration of the output signal in the high state.

Another embodiment provides for a device comprising a pulse signal generator configured to generate a pulsed signal, a first photodetector configured to detect the pulsed signal from the pulse generator and to generate therefrom a first periodic signal, and a second photodetector configured to detect the pulsed signal from the pulse generator after being reflected from an object and to generate therefrom a second periodic signal. The device further includes a first variable phase shifter configured to receive the pulsed signal and to generate a first phase shifted signal in response to a first control signal, and a second variable phase shifter configured to receive the pulsed signal and to generate a second phase shifted signal in response to a second control signal. A first control circuit is configured to receive as inputs, respectively, the first periodic signal and the first phase shifted signal, and to generate as an output the first control signal. A second control circuit is configured to receive as inputs, respectively, the second periodic signal and the second phase shifted signal, and to generate as an output the second control signal. The device further includes a comparator configured to receive as inputs, respectively, the first and second phase shifted signal and to generate as output an image signal, and a counter circuit configured to generate a value corresponding to a duration of a predetermined logic value of the image signal.

The foregoing and other features and advantages will be discussed in detail in the following non-limiting description of specific embodiments in connection with the accompanying drawings.

BRIEF DESCRIPTION OF THE DRAWINGS

For a more complete understanding of the present embodiments, and the advantages thereof, reference is now made to the following descriptions taken in conjunction with the accompanying drawings, in which:

FIG. 1, previously described, illustrates the principle of the "time of flight" method for determining the distance to an object;

FIGS. 2A to 2C are timing diagrams illustrating results obtained by means of the device of FIG. 1, as well the operation of "SPADs";

FIGS. 8A to 8E, 9A to 9E, and 10A to 10F are timing diagrams illustrating the operation of the device of FIG. 7.

For clarity, the same elements have been designated with the same reference numerals in the different drawings.

DETAILED DESCRIPTION OF ILLUSTRATIVE EMBODIMENTS

Figure 3:
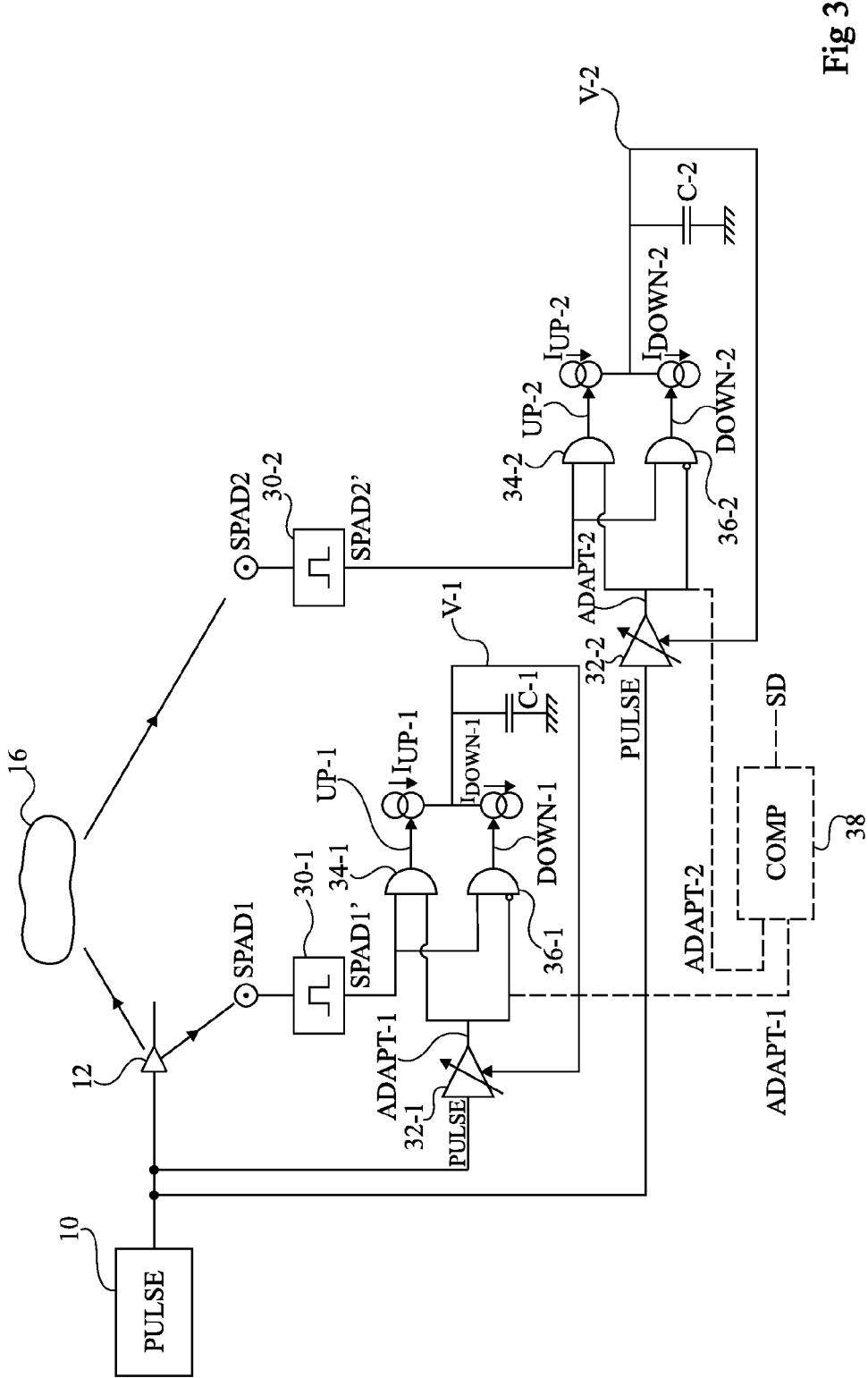
FIG. 3 illustrates a device for acquiring and reshaping signals.

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Before addressing the illustrated embodiments in detail, various embodiments and advantageous features thereof will be discussed generally. For instance, one embodiment provides a device and a method for processing signals transmitted by event generation sensors as a response to the reception of a light signal, overcoming all or part of the dis-advantages of prior art devices. Another embodiment provides a device and a method for determining a distance to an object by accurately determining the delay between signals obtained by the above method and device. Thus, some embodiments provide a method for defining, based on a first periodic signal, a second signal of same period, comprising the steps of: generating a third signal exhibiting detectable events; and synchronizing the second signal for each event.

According to an embodiment, the synchronization step is carried out by progressive phase shift of the second signal on each occurrence of an event on the third signal. According to a further embodiment, the method further comprises a final step during which the phase shift between the first and second signals no longer varies according to the occurrence of events on the third signal. According to yet another embodiment, the synchronization step comprises increasing the phase shift between the second and first signals when an event occurs on the third signal while the second signal is in a first state and decreasing the phase shift when an event occurs while the second signal is in a second state.

An embodiment further provides a method for determining the distance to an object, comprising the steps of: (a) generating a periodic light signal intended for a first photodetection device and for a second photodetection device after reflection on the object; (b) applying the above method to define a fourth signal, based on the light signal and on a signal comprising events in the form of pulses generated by a single-photon avalanche diode of the first photodetection device; (c) applying the above method to define a fifth signal, based on the light signal and on a signal comprising events in the form of pulses generated by a single-photon avalanche diode of the second reception device.

According to another embodiment, the method further comprises a final step during which the phase shift of each of the fourth and fifth periodic signals with respect to the light signal no longer varies and during which the phase shift between the fourth and fifth signals is determined.

According to yet another embodiment, the step of determination of the phase shift between the fourth and fifth signals comprises a step of forming of a sixth signal which is at a state determined during the period of phase shift between the fourth and fifth signals, and a step of measurement of the duration of the sixth signal in the determined state.

In some embodiments, the measurement of the duration of the sixth signal in the determined state is performed by means of a counter synchronized on a clock signal having a frequency different from the frequency of the sixth signal.

Some embodiments provide an electronic circuit capable of implementing the above described methods. For instance, according to one embodiment, the circuit comprises a first input capable of receiving a first periodic signal and a second input capable of receiving a third signal comprising an event for each period of the first signal, further comprising means for defining a second signal, of same period as the first signal, so that the second signal is synchronized on the average time of occurrence of an event over several periods of the first signal.

According to another embodiment, the circuit comprises a phase shifter receiving as an input the first signal and having its output forming the second signal, two dual-input AND-gates, each AND gate receiving as an input the third signal and the second signal, the output of the AND gates controlling the activation of a first and of a second current sources, the junction point of the two current sources being connected to a first terminal of a capacitor, the voltage across the capacitor forming the control signal of the phase shifter.

Still another embodiment provides a device for determining the distance to an object, comprising two circuits such as described hereabove, the two circuits receiving a same first signal on their first inputs and respectively receiving, on their second inputs, the signal originating from a first single-photon avalanche diode placed close to a light source powered by the first signal and the signal originating from a second single-photon avalanche diode placed to receive the signal originating from the light source after reflection on an object, the output of the first circuit, respectively of the second circuit, being connected to a non-inverting, respectively inverting, input of an AND gate having its output connected to the input of a device for measuring the duration of the output signal in the high state.

In some embodiments, the device comprises a clock input connected to the input of a first and of a second phase-locked loops having different output frequencies, the output of the first loop being used as the first signal of the two circuits, the measurement device comprising a counter incremented when the output of the AND gate is in the high state on occurrence of a rising edge of the signal at the output of the second phase-locked loop, during a cycle of counting of a period which is a multiple of the period at the output of the second phase-locked loop.

Turning now to FIG. 1. To obtain information relative to the distance to an object, a circuit and a method taking advantage of the data obtained from a device improved with respect to the device of FIG. 1 is here provided, the involved sensors integrating elements generating events on reception of the light information. In the following description, these elements will be referred to as SPADs, but other sensors of this type may be used.

More specifically, it is here desired to obtain, based on the signals provided by two SPADs, periodic signals having a relative phase shift corresponding, after an adjustment phase, to the phase shift between the average times of pulse transmission by SPADs in each period. The device enabling generating such signals will be described hereafter in relation with FIGS. 3, 4, 5, and 6A to 6F.

This first circuit is further integrated in a more complete device enabling accurate determination of the duration of the phase shift between signals generated by the first circuit. This device will be further detailed in relation with FIGS. 7, 8A to 8E, 9A to 9E, and 10A to 10F.

FIG. 3 illustrates a device for acquiring and reshaping signals according to an embodiment. The device of FIG. 3 comprises an electric generator 10 ("PULSE") having a periodic square output powering a light source 12. A first single-photon avalanche diode, SPAD1, is placed very close to light source 12 and thus almost instantaneously receives the signal transmitted by light source 12.

A second single-photon avalanche diode, SPAD2, is placed to receive the light signal emitted by source, 12, after reflection on an object 16. Since the arrangement of diodes SPAD1 and SPAD2 with respect to the object is conventional, it will not be described in further detail herein. A mask system between the two diodes may for example be used so that diode SPAD2 does not receive the light directly emitted by light source 12 and that diode SPAD1 does not receive the signal reflected by object 16.

The use of sensor SPAD1 very close to light source 12 provides improved reference information with respect to the reference information directly provided by generator 10. Indeed, since the signal coming out of sensor SPAD1 is of the same type as that coming out of sensor SPAD2, outer conditions, and especially the ambient light, have the same influence on both signals. The comparison between these signals is thus more reliable than the comparison between the signal output by sensor SPAD2 and the signal output by generator 10.

Diodes SPAD1 and SPAD2 generate pulses on reception of the light beams that they receive. In the following description, since the circuits associated with diodes SPAD1 and SPAD2 are identical, an extension "-1" will be used to designate circuit elements associated with diode SPAD1, and an extension "-2" will be used to designate elements associated with diode SPAD2.

The electronic circuit associated with the signal generated by diode SPAD1 will now be described, the circuit associated with diode SPAD2 being identical thereto.

The signal emitted by diode SPAD1 crosses a circuit 30-1 enabling to reshape the pulses generated by diode SPAD1. More specifically, circuit 30-1 delivers a signal SPAD1' exhibiting pulses having their beginning coinciding with the beginning of pulses of signal SPAD1, but of constant duration.

The signal coming out of generator 10 ("PULSE") is connected to the input of a phase shifter circuit 32-1 of variable phase shift, having its value varying according to a voltage V-1 applied thereto as a control. The output of phase shifter 32-1, called ADAPT-1, is thus phase-shifted with respect to the signal generated by generator 10.

An AND gate, 34-1, receives signal SPAD1' and signal ADAPT-1 on its two non-inverting inputs. A second AND gate, 36-1, receives signal SPAD1' on a first non-inverting input and signal ADAPT-1 on a second inverting input. The output of gate 34-1 is called UP-1 and the output of gate 36-1 is called DOWN-1. Signals UP-1 and DOWN-1 respectively control the activation of current sources IUP-1 and IDOWN-1, which are respectively placed between a power supply source (not shown) and a second terminal of a capacitor C-1 and the first terminal of capacitor C-1 and the ground. Capacitor C-1 is placed between the junction point of the current sources and the ground. The voltage across capacitor C-1 corresponds to signal V-1 for controlling phase shifter 32-1 of variable phase shift.

Signal ADAPT-1 of the circuit associated with diode SPAD1 and signal ADAPT-2 of the circuit associated with diode SPAD2 are connected to the input of a comparison system 38 (COMP) which enables generating a signal SD which is an image of the phase shift between signals ADAPT-1 and ADAPT-2.

Figure 4:
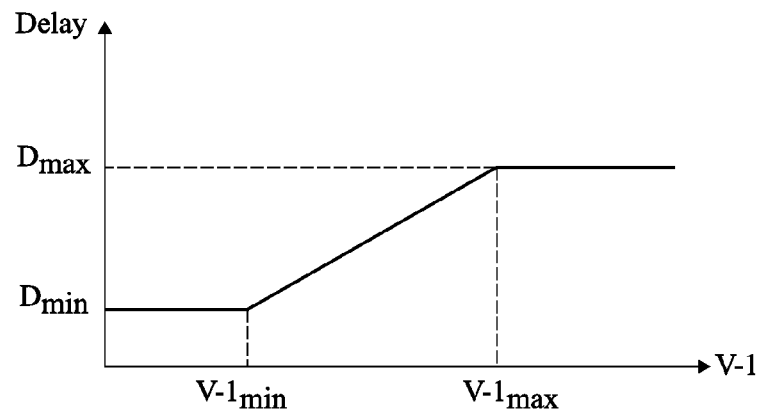
FIGS. 4 and 5 illustrate the operation of the device of FIG. 3.

FIG. 4 is a curve illustrating the operation of phase shifter 32-1 of FIG. 3. This curve illustrates phase shift DELAY between output signal ADAPT-1 and input signal PULSE, according to the value of control voltage V-1. As illustrated in this curve, the phase shift is constant and equal to a duration Dmin for a voltage V-1 smaller than a voltage V-1min and equal to a value Dmax when voltage V-1 is greater than a voltage V-1max. Between voltages V-1min and V-1max, phase shift DELAY follows a linear curve of positive slope between values Dmin and Dmax. As an example, minimum phase shift Dmin may be equal to zero and maximum phase shift Dmax may be equal to a period of the output signal of generator 10. Other configurations may be used, for example, if it is known offhand that the distance to the object to be detected implies a delay ranging between predetermined values.

Figure 5:
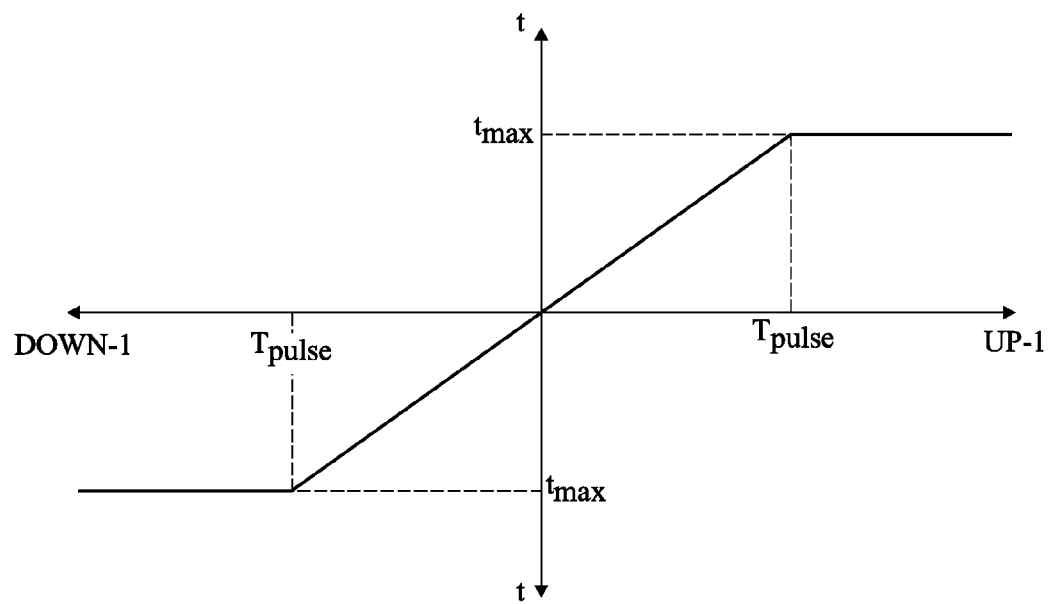

FIG. 5 is a curve illustrating the operation of the system comprising current sources IUP 1 and IDOWN 1, controlled by signals UP-1 and DOWN-1. The curve of FIG. 5 illustrates the activation time of current sources IUP-1 and IDOWN-1 according to the duration of signals UP 1 and DOWN 1. A threshold value TPULSE defines the minimum time limit for which the duration of signals UP-1 and DOWN 1 has no more influence. The aim is, when current source IUP-1 is activated, for capacitor C-1 to charge, which increases voltage V-1 and, when current source IDOWN-1 is activated, for capacitor C-1 to discharge, which decreases voltage V-1.

When the time in the high state of signal UP-1 exceeds duration TPULSE, current source IUP-1 is activated for a predetermined duration tmax. When signal DOWN-1 is in a high state for a duration greater than a duration TPULSE, current source IDOWN-1 is activated for duration tmax, and capacitor C-1 discharges by a predetermined value. If the duration of control of signals UP-1 and DOWN-1 is shorter than duration TPULSE, the duration of activation of sources IUP-1 and IDOWN-1 is proportional to this duration. Thus, during a cycle, if signal UP-1 and signal DOWN-1 are alternately in the high state, the amount of current injected into capacitor C-1 may be zero.

Figure 6:
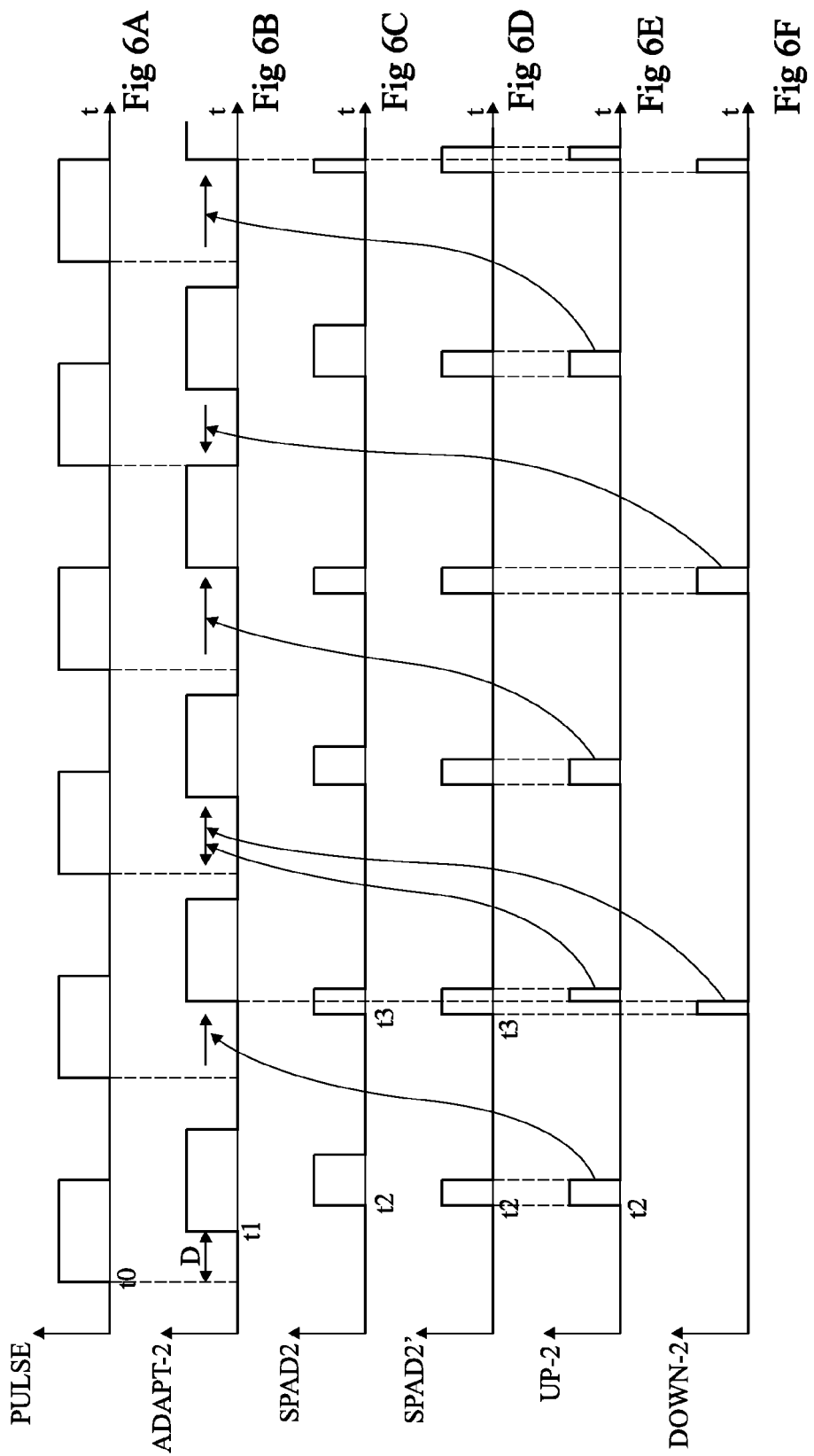
FIGS. 6A to 6F are timing diagrams illustrating the operation of the device of FIG. 3.

FIGS. 6A to 6F are timing diagrams illustrating the operation of the device of FIG. 3, as concerns the circuit associated with diode SPAD2. More specifically, FIG. 6A illustrates signal PULSE at the output of generator 10 or of light source 12, FIG. 6B illustrates signal ADAPT-2, FIG. 6C illustrates the signal transmitted by diode SPAD2, FIG. 6D illustrates signal SPAD2', FIG. 6E illustrates signal UP-2, and FIG. 6F illustrates signal DOWN-2.

At a time t0, signal PULSE switches from a low state to a high state. An arbitrary initial delay between signal PULSE and signal ADAPT-2 by one quarter of a period (D) is here considered. It should be noted that the initial delay of signal ADAPT-2 may be zero, randomly generated, or set to a predetermined value.

At a time t1, shifted by a duration D from time t0, signal ADAPT-2 switches to the high state. At a time t2, diode SPAD2 generates a pulse associated with the reception of a light photon reflected on the object. Signal SPAD2 is reshaped by circuit 30-2 to obtain a signal SPAD2' starting at time t2 but having a same duration over the different periods.

While signal SPAD2' is in the high state, signal ADAPT-2 also is in the high state, which causes a switching of signal UP-2 to the high state for the duration of the pulse of signal SPAD2'. As illustrated by an arrow, the switching to the high state of signal UP-2 increases the phase shift between signal PULSE and signal ADAPT-2 at the next period.

During the next cycle, diode SPAD2 emits a pulse at a time t3. In the shown example, a first half of the pulse reshaped by circuit 30-2 (SPAD2') occurs while signal ADAPT-2 is the low state, and the second half of the pulse occurs while signal ADAPT-2 is in the high state. This causes the successive switching to the high state of signal DOWN-2 and of signal UP-2. Current sources IUP-2 and IDOWN-2 are thus alternately activated. Since the current injections of these two sources mutually cancel, the phase shift between signals PULSE and ADAPT-2 does not vary during the third period.

As illustrated in the timing diagrams of FIGS. 6A to 6F, the method described hereabove carries on for a large number of cycles. Conversely to what is shown, the adjustment of the phase shift between signals ADAPT-2 and PULSE is performed by stages of low amplitude, which enable minimizing the influence of pulses which would occur far from the point of maximum power reception by diode SPAD2.

The circuit of FIG. 3 thus obtains, after a large number of adjustment cycles, a signal ADAPT-1 which is phase-shifted from signal PULSE and having the beginning of a period coinciding with the average time of occurrence of the pulses on diode SPAD1 and a signal ADAPT-2 which is phase-shifted from signal PULSE and having the beginning of a period coinciding with the average time of occurrence of the pulses on diode SPAD2. "ADLL" (Analog Delay Locked Loop) will be used hereinafter to designate a loop formed of a phase shifter 32, gates 34 and 36, current sources IUP and IDOWN, and a capacitor C, providing signal ADAPT.

Advantageously, the use of two ADLLs enables to avoid a phase shift that may occur between the signal of generator 10 and the signal of sensor SPAD2 due to the influence of ambient light. Further, the obtaining of signals ADAPT-1 and ADAPT-2 after a large number of adaptation cycles enables limiting the device sensitivity to the waveform of the light emitted by the generator.

The method provided herein provides two phases for each distance determination. A first phase comprises obtaining periodic phase-shifted signals ADAPT-1 and ADAPT-2, as described hereabove by means of the two ADLLs. As an example, the adjustment may be performed over a number of cycles varying between 100,000 and 10 million. In practice, if the aim is to obtain a proper adjustment within a delay ranging between 1 and 10 ms, the adjustment may be performed over approximately one million cycles, if signal PULSE has a period on the order of one nanosecond. A second phase comprises blocking the phase adjustment and working on signals ADAPT-1 and ADAPT-2 having a phase shift which no longer varies, and determining the duration of this phase shift.

However, the measurement of this phase shift is not immediate. Indeed, due to the short distances which are desired to be detected, this phase shift may be very small. It is thus necessary to provide a device providing a distance information based on signals ADAPT-1 and ADAPT-2.

Many variations of the device and of the method described hereabove may be provided. Especially, a step prior to the phase shift adjustment may be provided, during which the voltage across capacitors C-1 and C-2 is initialized to a predetermined value, for example, half its maximum value. This enables a faster adjustment towards appropriate phase shifts of signals ADAPT-1 and ADAPT-2. It may also be provided to set the voltage across capacitors C-1 and C-2 to a different value if information relative to the distance is known offhand. For example, the initial adjustment of the voltage across the capacitors may be performed by means of a comparator receiving signal ADAPT-1 or ADAPT-2 on an input and a reference voltage on another input, the output of this comparator activating current sources IUP-1, IUP-2, IDOWN-1 or IDOWN-2.

A step preceding the phase shift adjustment may also be provided, during which a phase shift in the idle state, that is, with no light wave reception, is measured between voltage ADAPT-1 and ADAPT-2. This phase shift will then be subtracted from the measurements if necessary.

Figure 7:
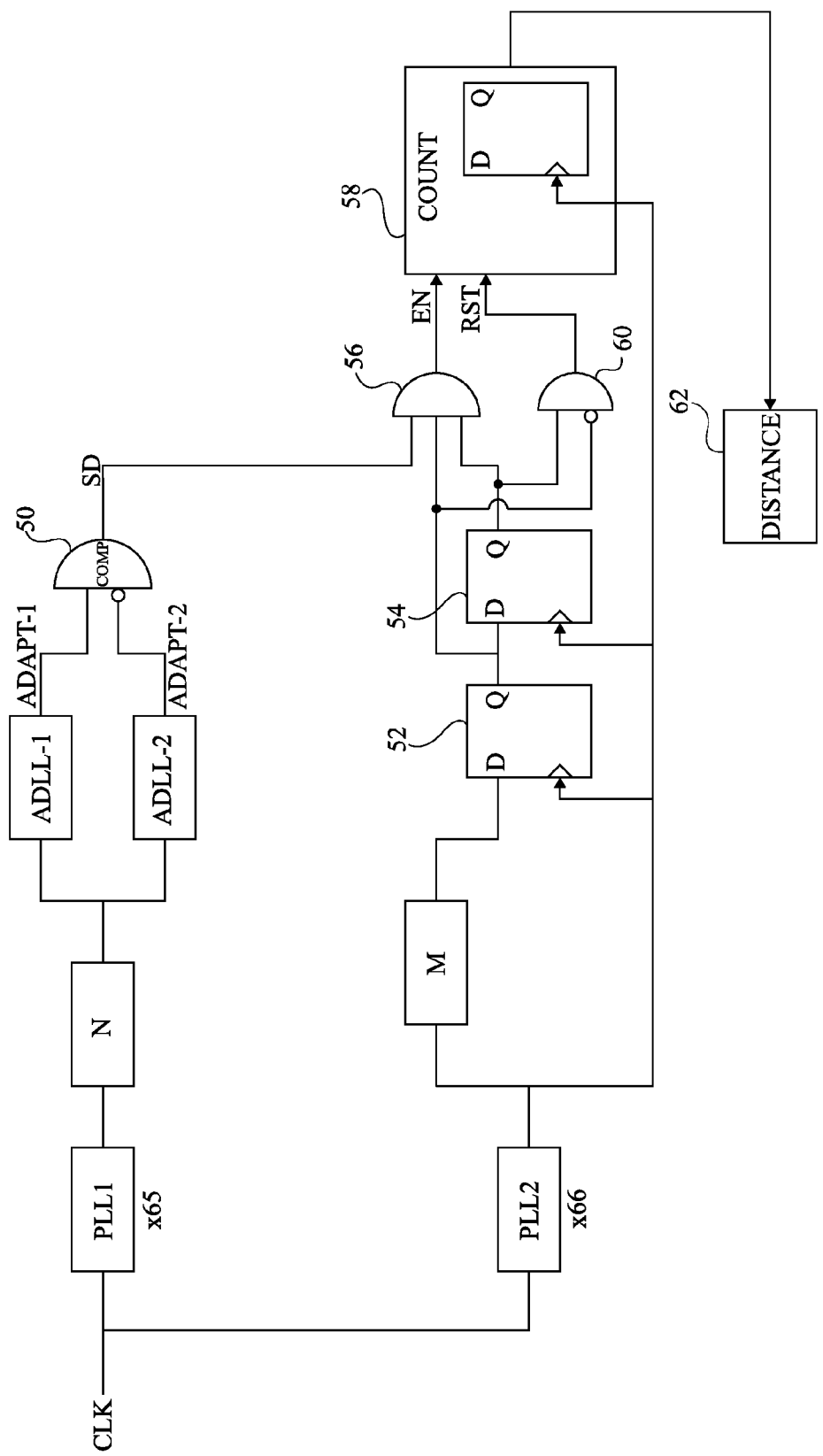
FIG. 7 illustrates a complete device for calculating the distance to an object based on signals obtained from the device of FIG. 3.

FIG. 7 illustrates a more complete device for determining the duration of the phase shift between signals ADAPT-1 and ADAPT-2, and thus the distance to object 16. The circuit of FIG. 7 schematically shows the elements of the circuit of FIG. 3: two blocks ADLL-1 and ADLL-2 correspond to the circuits enabling to generate, from an input signal defining the frequency of signal PULSE, signals ADAPT-1 and ADAPT-2.

The circuit of FIG. 7 comprises a main input receiving a clock signal CLK. A first branch of the circuit, receiving clock signal CLK as an input, comprises a first phase-locked loop PLL1 and a circuit for dividing the frequency by a factor N. Phase-locked loop PLL1 increases the frequency of the output signal by a factor nPLL1, and the dividing circuit divides this frequency to obtain a frequency lower than the maximum avalanche triggering frequency of diodes SPAD.

The output signal of divider N corresponds to signal PULSE of the circuit of FIG. 3 for circuits ADLL1 and ADLL2. Signals ADAPT-1 and ADAPT-2, once adjusted and set, are connected to the input of an AND gate 50 (COMP), signal ADAPT-1 being connected to a non-inverting input and signal ADAPT-2 to an inverting input. Signal SD at the output of gate 50 thus is in the high state during each period for a duration corresponding to the (set) phase shift between signals ADAPT-1 and ADAPT-2.

To obtain information relative to the duration in the high state of signal SD, a counter configured to obtain, after the counting, a number which is an image of this duration has been devised.

This counter operates over several consecutive periods of signal SD. To form this counter, clock input CLK is connected to the input of a second phase—locked loop PLL2 having a frequency multiplication coefficient, nPLL2, which is different from but which may be close to multiplication coefficient nPLL1 of phase-locked loop PLL1. As an example, if clock signal CLK has a frequency on the order of a few MHz, phase-locked loops PLL1 and PLL2 may have multiplication coefficients such as 65 and 66. Other values may of course be used.

The output signal of phase-locked loop PLL2 is connected to a frequency dividing circuit of coefficient M, the output signal of divider M defining the period during which the counter operates before a reset. The counting period must be sufficient to obtain reliable information at the counter output. Especially, the counting period must correspond at least to the lowest common multiple between the periods of the output signals of loop PLL1 and of loop PLL2.

The output of phase-locked loop PLL2 is connected to the control input (on the rising edge) of two D flip-flops, 52 and 54. The output of divider M is connected to the main input of first D flip-flop 52, the Q output of flip-flop 52 being connected to the main input of flip-flop 54.

A three-input AND gate 56 receives, on its inputs signal SD, the output of flip-flop 52, and the output of flip-flop 54. The output of gate 56 forms the signal of activation of a counter COUNT 58. Counter 58 is synchronized on the rising edges of the output signal of phase-locked loop PLL2. A two-input AND gate 60 receives the output of flip-flop 54 on a non-inverting input and the output of flip-flop 52 on an inverting input, the output of gate 60 forming a signal for resetting (RST) counter 58.

Counter 58 operates as follows. On each rising edge of the output signal of phase-locked loop PLL2, if the output of gate 56 is in the high state, that is, if signal SD is in the high state and that one is in a counting phase (output signal of divider M in the high state), the counter increments. Due to the frequency difference of the output signals of phase-locked loops PLL1 and PLL2, the counter only increments a small number of times in a counting cycle, as will be seen in the timing diagrams of FIGS. 8A to 8E, 9A to 9E, and 10A to 10F. The number stored at the end of a counting cycle on the counter can be associated with a duration in the high state of signal SD, and thus with a distance to the object.

FIGS. 8A to 8E, 9A to 9E, and 10A to 10F are timing diagrams illustrating the operation of the device of FIG. 7. More specifically, the timing diagrams of FIGS. 8A to 8E illustrate a full counting cycle, FIGS. 9A to 9E are an enlargement of FIGS. 8A to 8E (portion A) over a few increments of counter 58, and FIGS. 10A to 10F illustrate the detail of an incrementing of counter 58 (portion B of FIGS. 9A to 9E).

The timing diagrams of FIGS. 8A to 8E, of FIGS. 9A to 9E, and of FIGS. 10A to 10E respectively illustrate signal ADAPT-1, signal ADAPT-2, signal SD, the output signal of divider M, and the evolution of counter 58. The timing diagram of FIG. 10F further illustrates the output signal of loop PLL2.

As can be seen in these different timing diagrams, the counter is reset after M periods of the output signal of loop PLL2. The enlargements of FIGS. 10A to 10F show two pulses on signal SD, one implying an increment of the counter, the other implying none.

At a time T1, a pulse on signal SD appears, but no rising edge of the output signal of phase-locked loop PLL2 occurs during this pulse, which does not modify the counter state. At a time T2, a second pulse on signal SD appears, and a rising edge of the output signal of phase-locked loop PLL2 occurs during this pulse, which increments the counter.

Due to the frequency difference between the output signals of loops PLL1 and PLL2, the rising edges of the output signal of loop PLL2, over a counting duration, occur at different times of the period of signal SD. Thus, on a counting cycle, the longer the duration of the pulse on signal SD, the more the counter increments. The value on counter 58 at the end of each counting cycle thus enables obtaining, by means of a block 62 (DISTANCE) for reading the value on the counter at the end of the cycle, a very accurate value of the distance to the object. The device of FIG. 7 further enables obtaining a very fine time accuracy by using clock signals at reasonable frequencies for an integrated circuit implementation, smaller than 1 GHz.

It should be noted that several counting cycles may be provided for a same distance to the object, with the possibility of then calculating an average to determine the most accurate possible distance to the object.

It may also be provided to shift signal SD by a few periods of the output signal of block PLL1, with respect to the beginning of a period of the output signal of divider N, to make sure that all switchings to the high state of signal SD are effectively counted by the counter. The duration of the pulses on signal SD may also be artificially increased for a better reading of the on-state duration of this signal, the value stored on the counter at the end of the counting cycle being accordingly adapted.

Specific embodiments of the present invention have been described. Various alterations, modifications, and improvements will readily occur to those skilled in the art. In particular, the present invention is not limited to an association of ADLLs coupled to SPADs and to a system for determining the on-state duration such as that in FIG. 7.

Indeed, the above-described ADLLs (FIG. 3) may for example be coupled to other types of light sensors than SPADs, as long as the signals originating from these sensors are in the form of events occurring with the reception of light pulses. For example, rapid charge transfer photodiodes, which alternately transfer the photogenerated charges onto two read nodes during a cycle, may be used. The amount of charges on each node in each cycle provides information relative to the distance to the object.

In the case of such diodes, the signal exhibiting detectable events considered to implement the method described herein will originate from the signal on each of the read nodes, the time of occurrence of said events being associated with the amount of light on each node. Means enabling generating said events from the signal on the two read nodes may be provided.

Also, to determine the duration of a signal which is an image of the phase shift between two signals output by ADLLs, other devices than that described in relation with FIG. 7 may be used, and especially analog-to-digital converters, as long as these devices provide an accurate determination of the duration of signal SD, or of the phase shift between the two periodic signals output by the ADLLs.

Various embodiments with different variations have been described hereabove. It should be noted that those skilled in the art may combine various elements of these various embodiments and variations once informed by the present disclosure. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

Although the present embodiments and their advantages have been described in detail, it should be understood that various changes, substitutions and alterations can be made herein without departing from the spirit and scope of the disclosure as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for determining a distance, the method comprising:
   generating a first signal;
   transmitting the first signal from a transmitter towards an object;
   generating a second signal with a same period as the first signal;
   generating a third signal that includes detection pulses, wherein each detection pulse corresponds to detecting a reflection off the object of the transmitted first signal;
   synchronizing the second signal with each detection pulse of the third signal;
   generating a fourth signal based on the first signal, the fourth signal based on detecting the transmitted first signal before it reflects off the object; and
   determining a distance between the transmitter and the object by comparing the second signal and the fourth signal.

2. The method of claim 1, wherein synchronizing the second signal comprises progressively phase shifting the second signal on occurrences of detection pulses of the third signal.

3. The method of claim 1, wherein determining the distance is performed during a final step during which a phase shift between the first signal and the second signal no longer varies according to the occurrence of the detection pulses on the third signal.

4. The method of claim 1, wherein synchronizing the second signal comprises increasing a phase shift between the first and fourth signals when a detection pulse occurs on the third signal while the second signal is in a first state and decreasing said phase shift when a detection pulse occurs while the second signal is in a second state.

5. The method of claim 1, further comprising determining a phase shift between the second and fourth signals during a stage when the phase shift of each of the second and fourth signals with respect to the first signal no longer varies.

6. The method of claim 5, wherein determining the phase shift between the second and fourth signals comprises a step of forming of an image signal which is at a determined state during the period of phase shift between the second and fourth signals, and further comprising a step of measuring the duration of the image signal in the determined state.

7. The method of claim 6, wherein the step of measuring the duration of said image signal in the determined state is carried out by a counter synchronized on a clock signal having a frequency different from the frequency of the image signal.

8. The method of claim 1, wherein determining the distance between the transmitter and the object comprises determining a phase shift between the second signal and the fourth signal and calculating the distance based on the phase shift.

9. The method of claim 1, wherein generating a fourth signal comprises:
   generating the fourth signal with a same period as the first signal;
   generating a detection signal including detection pulses, wherein each detection pulse corresponds to detecting the transmitted first signal before it reflects off the object; and
   synchronizing the fourth signal with each detection pulse of the detection signal.

10. The method of claim 1, wherein the first signal is a light signal.

11. An electronic circuit comprising:
    a first input capable of receiving a first periodic signal, the first periodic signal being supplied to a transmitter;
    a second input capable of receiving a first event signal comprising an event in each period of the first periodic signal;
    a third input capable of receiving a second event signal comprising an event in each period of the first periodic signal;
    means for defining a second signal having a same period as the first periodic signal, so that the second signal is synchronized with the event in the first event signal in each period over several periods of the first periodic signal; and
    means for defining a third signal having a same period as the first periodic signal, so that the third signal is synchronized with the event in the second event signal in each period over several periods of the first periodic signal, wherein the second and third signals are defined so that a phase shift between the second signal and the third signal is proportional to a distance between the transmitter and an object.

12. The circuit of claim 11, comprising:
    a phase shifter receiving as an input the first periodic signal and having an output forming the second signal,
    two dual-input AND gates, each AND gate receiving as an input the first event signal and the second signal, an output of said AND gates controlling an activation of a first and of a second current source, respectively, a junction point of the two current sources being connected to a first terminal of a capacitor, a voltage across said capacitor forming a signal for controlling the phase shifter.

13. A device for determining a distance to an object, the device comprising:
    two circuits, said two circuits receiving a same first signal on their respective first inputs and receiving, on their second inputs, respectively, a signal originating from a first single-photon avalanche diode placed close to a light source powered by the first signal, and a signal originating from a second single-photon avalanche diode placed to receive a signal originating from the light source after reflection on an object;

the output of the first circuit being connected to a non-inverting input of an AND gate, the output of the second circuit being connected to an inverting input of the AND gate, the AND gate having its output connected to an input of a device for measuring a high state duration of an output signal of the AND gate; and a clock input connected to respective inputs of first and of second phase-locked loops having different output frequencies, the output of the first phase-locked loop being used as a first signal of said two circuits, the device for measuring further comprising a counter incremented when the output of the AND gate is in the high state on occurrence of a rising edge of the output signal of the second phase-locked loop, during a cycle of counting of a period which is a multiple of the period at the output of the second phase-locked loop.

14. A device comprising:

a pulse signal generator configured to generate a pulsed signal;

a first photodetector configured to detect the pulsed signal from the pulse generator before being reflected from an object and to generate therefrom a first periodic signal;

a second photodetector configured to detect the pulsed signal from the pulse generator after being reflected from the object and to generate therefrom a second periodic signal;

a first variable phase shifter configured to receive the pulsed signal and to generate a first phase shifted signal in response to a first control signal;

a second variable phase shifter configured to receive the pulsed signal and to generate a second phase shifted signal in response to a second control signal;

a first control circuit configured to receive as inputs, respectively, the first periodic signal and the first phase shifted signal, and to generate as an output the first control signal;

a second control circuit configured to receive as inputs, respectively, the second periodic signal and the second phase shifted signal, and to generate as an output the second control signal;

a comparator configured to receive as inputs, respectively, the first and second phase shifted signals and to generate as output an image signal, wherein the image signal corresponds to a phase difference between the first and second phase shifted signals; and a counter circuit configured to generate a value corresponding to a duration of a predetermined logic value of the image signal.

15. The device of claim 14 further wherein:

the first control circuit includes
 a first AND gate configured to receive at respective non-inverting inputs the first phase shifted signal and the first periodic signal, and having an output coupled to a first current source,
 a second AND gate configured to receive a non-inverting input the first periodic signal and to receive at an inverting input the first phase shifted signal, and having an output coupled to a second current source, the first current source and first current source sharing a first common node,
 a first capacitor coupled between the first common node and ground, wherein a voltage generated across the first capacitor is coupled to a control input of the first variable phase shifter; and the second control circuit includes
 a third AND gate configured to receive at respective non-inverting inputs the second phase shifted signal and the second periodic signal, and having an output coupled to a third current source,
 a fourth AND gate configured to receive a non-inverting input the second periodic signal and to receive at an inverting input the second phase shifted signal, and having an output coupled to a fourth current source, the third current source and fourth current source sharing a second common node,
 a second capacitor coupled between the second common node and ground, wherein a voltage generated across the second capacitor is coupled to a control input of the second variable phase shifter; and the second periodic signal is shaped by a second shaping circuit to have constant duration pulses.

16. The device of claim 15, wherein the first current source increases the voltage generated across the first capacitor and the second current source decreases the voltage generated across the first capacitor and wherein the third current source increases the voltage generated across the second capacitor and the fourth current source decreases the voltage generated across the second capacitor.

17. The device of claim 15 further including an output, the output configured to output a signal having a value corresponding to a distance between the pulse signal generator and the object.

18. The device of claim 14 wherein at least one of the first and second photodetector is a single-photon avalanche diode.

19. The device of claim 14 wherein the pulse signal generator includes:

a clock signal generator;

a first phase locked loop having an input coupled to an output of the clock generator; and a frequency divider coupled to an output of the first phase locked loop and configured to generate the pulse signal.

20. The device of claim 19 further comprising:

a second phase locked loop having an input coupled to an output of the clock generator; and a second frequency divider coupled to an output of the second phase locked loop and having an output coupled to a clock input of the counter circuit.

21. The device of claim 14 wherein each at least one of the first and second photodetectors is a rapid charge transfer photodiode.

22. The device of claim 14 further including an output, the output configured to output a signal having a value corresponding to a distance between the pulse signal generator and the object.

23. A method of operating a circuit, the method comprising:

(a) generating an input pulse;

(b) generating a light pulse from the input pulse;

(c) transmitting the light pulse toward an object and a first photodetector;

(d) detecting the transmitted light pulse at the first photodetector before the light pulse reflects off the object;

(e) detecting a reflection of the transmitted light pulse at a second photodetector;

(f) generating a first periodic signal based on the input pulse and the transmitted light pulse detected in (d);

(g) generating a second periodic signal based on the input pulse and the reflection of the transmitted light pulse detected in (e); and (h) generating a phase signal based on a phase difference between the first periodic signal and the second periodic signal.

24. The method of claim 23, further comprising:

(i) calculating a distance from a source of the light pulse to the object based on the generated phase signal.

25. The method of claim 23, wherein generating the first periodic signal comprises generating the first periodic signal based on the input pulse and synchronizing the first periodic signal with the detected transmitted light pulse, and generating the second periodic signal comprises generating the second periodic signal based on the input pulse and synchronizing the second periodic signal with the detected reflection of the transmitted light pulse.

26. The method of claim 23, further comprising:

repeating steps (a)-(e) a plurality of iterations;

synchronizing the first periodic signal with the detected transmitted light pulses for each repeated iteration, wherein synchronizing comprises phase shifting the first periodic signal to align with the detected transmitted light pulses; and synchronizing the second periodic signal with the detected reflection of the transmitted light pulses for each repeated iteration, wherein synchronizing comprises phase shifting the second periodic signal to align with the detected reflection of the transmitted light pulses.

27. The method of claim 23, wherein detecting in steps (d) comprises generating a first electrical signal at a first single photon avalanche diode, and detecting in steps (e) comprises generating a second electrical signal at a second single photon avalanche diode.

* * * * *